March 11, 1952     A. H. HEILAND     2,588,720
FISHING SPOON
Filed March 26, 1949

ALBERT H. HEILAND
INVENTOR.

BY Arnold & Mathis
Attys.

Patented Mar. 11, 1952

2,588,720

UNITED STATES PATENT OFFICE 2,588,720

FISHING SPOON

Albert H. Heiland, Seattle, Wash.

Application March 26, 1949, Serial No. 83,653

6 Claims. (Cl. 43—42.5)

My invention relates to trolling spoons of the type used in fishing for game fish which will bite on live bait.

More particularly, my invention relates to a trolling or casting spoon of novel shape and configuration, so that it will have a motion in the water which is particularly alluring to game fish.

A further object of my invention is to provide a trolling spoon which lies substantially in a vertical plane while trolling and has a movement of darting alternately in one direction and then another, thus assimilating the action of a minnow which is unusually attractive to game fish.

Another object of my invention is to provide a spoon which will not tend to rotate and thus I have eliminated any need for swivels between the spoon and the fish line.

It is another object of my invention to provide a spoon which may be trolled at high speed or cast into fast water with a limited tendency to spin, but which will dart from side to side and provide a desired action in the water.

Other objects of my invention are to provide a fishing spoon having a flat mid-body portion of substantially truncated triangular shape; head and tail portions which are integral with said mid-body portion and which are angularly disposed to said mid-body portion in opposite directions.

Other objects of my invention are to provide definite angular relationships between the mid-body portion of the spoon and the said head and tail portions thereof.

Another object of my invention is to provide a spoon of minimum weight so that the same can be used as a trolling spoon and can be cast with a fly rod.

Other objects of my invention are to provide a spoon of fishlike configuration and to so arrange the hook and the tail-like portion of the fish that all danger of the hook entangling with the spoon is eliminated.

The spoons of my invention have great utility in fresh water fishing. They may be cast by employing a fly rod with or without weight. They may be cast and allowed to sink to a desired depth and then brought in by stripping. The spoons are particularly effective on trout, steelhead, bass, crappie, blackmouth, salmon, and perch, to mention some of the fish of the west which have been taken with this lure.

The above mentioned general objects of my invention, together with others inherent in the same, are attained by the devices illustrated in the accompanying drawings, throughout which like reference numerals indicate like parts:

Figure 1:
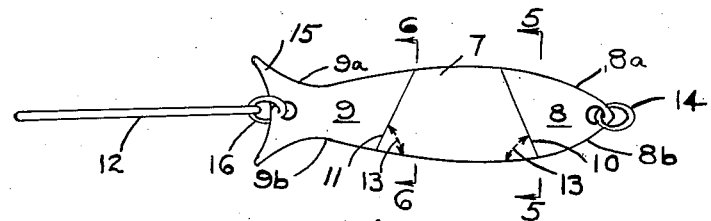
Figure 1 is a side elevational view of a spoon embodying my invention.

In the drawings the spoon has a flat mid-body portion 7, flat head portion 8, and flat tail portion 9. The said portions 7, 8 and 9 are formed integrally from a flat piece of metal and the portions 8 and 9 are joined respectively to portion 7 on lines 10 and 11. The flat piece of metal from which the portions 7, 8 and 9 are formed is preferably less than twenty thousandths of an inch and in the range of fifteen to twenty thousandths of an inch if the entire length of the spoon is approximately seven-eighths of an inch. With such a spoon, the hook 12 is preferably size 10—Norwegian salmon hook—as numbered by Mustad and Sons. In the event that the entire length of the spoon is five-eighths of an inch, then the metal may be approximately eighteen thousandths of an inch thick and the size of hook employed is preferably size 8—Norwegian bait hook—as numbered by Mustad and Sons. In the event that the spoon is approximately one and three-quarters of an inch long, then the metal is preferably about twenty-five thousandths of an inch and the hook is size 1—Norwegian salmon hook—as numbered by Mustad and Sons. From the foregoing, it will be apparent that the fishing spoon is preferably of a rather small size compared with currently made fishing spoons, and particularly for fishing spoons used in trolling for salmon.

The angles 13 between the head portion 8 and mid-portion 7 and between the tail portion 9 and the mid-portion 7 are preferably equal and are substantially sixty-five degrees to the base of the truncated triangle. The head portion 8 is bent on line 10 and the angle between portions 7 and 8 is approximately one hundred and seventy degrees. Also the angle between the portions 9 and 7 is the same angle or approximately one hundred and seventy degrees. However, the portions 8 and 9 are bent in opposite directions. To more clearly illustrate the spoon in the drawings the top and bottom portions of 8 are numbered 8a and 8b and those of 9 are numbered 9a and 9b.

Preferably, an eye 14 is employed at the head or leading portion of the spoon to connect the same with any suitable fishing line (now shown). The tail 15 of the spoon is preferably provided so that the eye 16 can interconnect the tail portion 9 and the hook 12 and so dispose the hook 12 that it cannot become entangled with the spoon and thus lose its effectiveness.

The spoon is preferably symmetrical so that substantially the same surface area is provided to the head portion 8 as is provided in the tail or trailing portion 9. Also the mid-portion 7 is preferably positioned centrally of the mass of the spoon.

While I have shown eyes 14 and 16, they may be dispensed with and the fishing line may be secured directly to the head portion 8 and the hook may be secured directly with the tail portion 9. Preferably, if a smaller size spoon is made, such as five-eighths of an inch, better balance will obtain if the eye 16 is not employed and the hook 12 is directly secured to the tail portion 9.

The material employed to provide the portions 7, 8 and 9 of the spoon is preferably sterling silver, Phosphor bronze, nickel silver with holes along the longitudinal axis of the spoon to assimilate parr marks, brass, and dimple copper.

While I am not positive of the reasons for the particular action of my lure in the water, I have demonstrated that the same may be trolled at relatively high rates of speed as compared to present-day spoons, and the same can be used in casting into very fast water. Other factors which may or may not enter into the reasons for the action of my lure in the water include: the extremely light weight thereof (the seven-eighths of an inch length spoon weighs approximately one-fiftieth of an ounce); the fish-like body; the balance of the fish wherein the truncated triangular mid-portion 7 is at the central portion of the mass of the spoon; and the angularity of the bends about lines 10 and 11.

During trolling, the spoon tends to ride with the portion 7 in a vertical plane and with the base of the truncated triangle downwardly—hence the drawings have illustrated the spoon in such position. However, the spoon often rides in a position at one hundred an eighty degrees thereto. The spoon tends to travel in one direction until sufficient pressure is created on the tail portion 9 to cause the spoon to dart in the opposite direction, and such action continues as the spoon darts from side to side. However, the action is not uniform and the action is decidedly erratic and alluring. As the spoon is changing its direction, it tends to turn on its side, or with the portion 7 in a horizontal plane rather than in a vertical plane. However, the spoon does not rotate which thus eliminates the necessity of any swivel. In prior art spoons, a swivel was necessary to prevent the rotation of the spoon from twisting the fishing line connected with the spoon.

Figure 2:
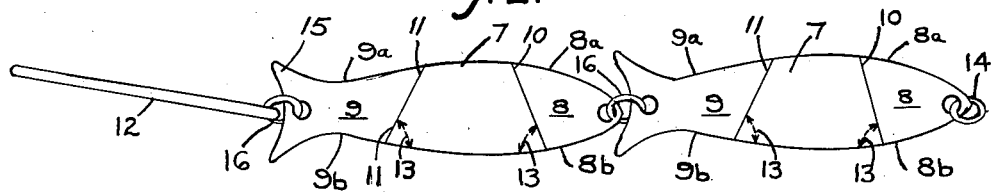
Fig. 2 is a side elevational view of a tandem spoon embodying my invention.
Figure 3:
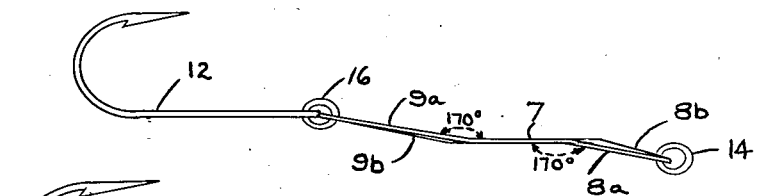
Fig. 3 is a plan view of the construction shown in Fig. 1.
Figure 4:
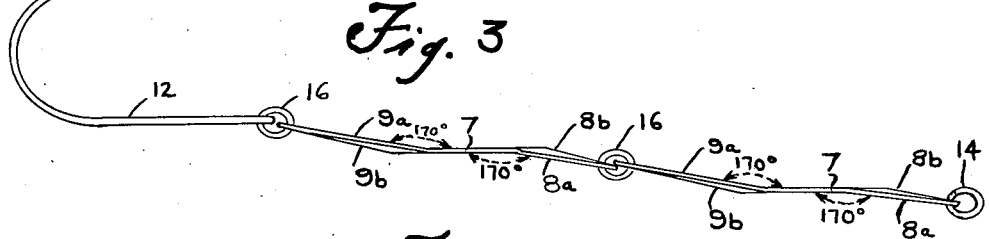
Fig. 4 is a plan view of the construction shown in Fig. 2.
Figure 5:
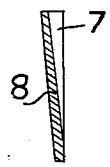
Fig. 5 is a sectional view taken substantially on broken line 5—5 of Fig. 1.
Figure 6:
Fig. 6 is a sectional view taken substantially on broken line 6—6 of Fig. 1.

The spoon of my invention can either be used alone as indicated in Figs. 1, 3, 5 and 6, or in tandem with a plurality of spoons secured together as is indicated in Figs. 2 and 4. As each of the spoons shown in tandem in Figs. 2 and 4 is the spoon shown in the other figures, the parts are given similar numbers and without further description thereof as such description is thus incorporated by reference.

The action in the water of the tandem spoon in my invention is very similar to that described in connection with a single spoon.

Spoons of my invention may be employed in either trolling or casting and for fish of varying size. For example, on a spoon of my invention which was seven-eighths of an inch long, I have caught many salmon, one of which weighed twenty-six pounds.

Throughout the foregoing description I have defined that the central portion 7 of my spoon is a truncated triangle in shape. The term "truncated" is generally used to describe a form of solid body such as a truncated cone or prism. As I have previously indicated, preferably the spoons of my invention have a thickness of preferably less than twenty thousandths of an inch. Thus the prism of the central portion 7 could well be defined as constituting a flat mid-body portion having its sides defining a trapezium wherein the normal top an bottom sides are arcuate and the lateral sides defined by lines 10 and 11 angularly converge toward each other from the normal bottom to the top thereof. The spoon of my invention normally rides or travels in the water in a vertical position and hence the normal top and bottom sides as just mentioned. Thus in the claims the nomenclature and language just expressed are included.

Obviously, changes may be made in the forms, dimensions, and arrangements of the parts of my invention, without departing from the principle thereof, the above setting forth only preferred forms of embodiment of my invention.

I claim:

1. A relatively small and lightweight fishing spoon comprising a flat mid-body portion having its sides defining a trapezium wherein the normal top and bottom sides are arcuate and the lateral sides thereof angularly converge toward each other from the normal bottom to the top thereof; a fish-like head portion integral with, connected along one lateral side of said mid-body portion, and angularly disposed laterally to said mid-body portion; and a flat fish-like tail portion integral with, connected along the other lateral side of said mid-body portion, and angularly disposed to said mid-body portion, said tail and head portions being angularly disposed laterally in opposite directions from said mid-body portion.

2. A relatively small and lightweight fishing spoon comprising a flat mid-body portion having its marginal portions defining a trapezium wherein the normal top and bottom edges are arcuate and the lateral sides thereof angularly converge toward each other from the normal bottom to the top thereof; a fish-like head portion integral with, connected along one lateral side of said mid-body portion, and angularly disposed laterally and at substantially one hundred and seventy degrees to said mid-body portion; and a flat fish-like tail portion integral with, connected along the other lateral side of said mid-body portion, and angularly disposed to said mid-body portion, said tail and head portions being angularly disposed laterally in opposite directions from said mid-body portion.

3. A relatively small and lightweight fishing spoon comprising a flat mid-body portion having its marginal portions defining a trapezium wherein the normal top and bottom edges are arcuate and the lateral sides thereof angularly converge toward each other from the normal bottom to the top thereof; a fish-like head portion integral with, connected along one lateral side of said mid-body portion, and angularly disposed laterally to said mid-body portion; and a flat fishlike tail portion integral with, connected along the other lateral side of said mid-body portion, and angularly disposed and at substantially one hundred and seventy degrees to said mid-body portion, said tail and head portions being angularly disposed laterally in opposite directions from said mid-body portion.

4. A relatively small and lightweight fishing spoon comprising a flat mid-body portion having its sides defining a trapezium wherein the normal top and bottom sides are arcuate and the lateral sides thereof angularly converge toward each other from the normal bottom to the top thereof; a fish-like head portion integral with, connected along one lateral side of said mid-body portion, and angularly disposed laterally to said mid-body portion; and a flat fish-like tail portion integral with, connected along the other lateral side of said mid-body portion, and angularly disposed to said mid-body portion, said tail and head portions being angularly disposed laterally in opposite directions from and at substantially equal angles to said mid-body portion.

5. A relatively small and lightweight fishing spoon comprising a flat mid-body portion having its sides defining a trapezium wherein the normal top and bottom sides are arcuate and the lateral sides thereof angularly converge toward each other from the normal bottom to the top thereof, the said lateral sides being disposed to the said bottom at angles of substantially sixty-five degrees; a fish-like head portion integral with, connected along one lateral side of said mid-body portion, and angularly disposed laterally to said mid-body portion; and a flat fish-like tail portion integral with, connected along the other lateral side of said mid-body portion, and angularly disposed to said mid-body portion, said tail and head portions being angularly disposed laterally in opposite directions from said mid-body portion.

6. A relatively small and lightweight fishing spoon comprising a flat mid-body portion having its sides defining a trapezium wherein the normal top and bottom sides are arcuate and the lateral sides thereof angularly converge toward each other from the normal bottom to the top thereof; a fish-like head portion integral with, connected along one lateral side of said mid-body portion, and angularly disposed laterally to said mid-body portion; and a flat fish-like tail portion integral with, connected along the other lateral side of said mid-body portion, and angularly disposed to said mid-body portion, said tail and head portions being angularly disposed laterally in opposite directions from said mid-body portion and having substantially equal surface areas, and said mid-body portion being disposed substantially centrally of the mass of the spoon.

ALBERT H. HEILAND.

REFERENCES CITED

The following references are of record in the file of this patent:

UNITED STATES PATENTS

| Number | Name | Date |
|---|---|---|
| D. 153,676 | Gardemeyer | May 10, 1949 |
| 1,317,890 | Patton | Oct. 7, 1919 |
| 1,638,215 | Rogers | Aug. 9, 1927 |
| 1,837,656 | Crosby | Dec. 22, 1931 |